(12) United States Patent
Shen et al.

(10) Patent No.: US 7,478,036 B2
(45) Date of Patent: Jan. 13, 2009

(54) METHOD AND SYSTEM FOR AUTOMATICALLY EXTRACTING NEW WORD

(75) Inventors: Liqin Shen, Beijing (CN); Qin Shi, Beijing (CN); Haixin Chai, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 800 days.

(21) Appl. No.: 09/944,332

(22) Filed: Aug. 30, 2001

(65) Prior Publication Data

US 2002/0077816 A1 Jun. 20, 2002

(30) Foreign Application Priority Data

Aug. 30, 2000 (CN) ............................... 00 1 26471

(51) Int. Cl.
*G06F 17/27* (2006.01)
(52) U.S. Cl. .................... 704/9; 704/1; 704/8; 704/10
(58) Field of Classification Search .................. 704/9, 704/10, 1, 8; 341/28; 715/533; 717/147
See application file for complete search history.

(56) References Cited

U.S. PATENT DOCUMENTS

| 4,667,290 | A | * | 5/1987 | Goss et al. | .................. 717/147 |
| 6,098,034 | A | * | 8/2000 | Razin et al. | ..................... 704/9 |
| 6,636,162 | B1 | * | 10/2003 | Kushler et al. | ................. 341/28 |
| 6,848,080 | B1 | * | 1/2005 | Lee et al. | ..................... 715/533 |
| 6,904,402 | B1 | * | 6/2005 | Wang et al. | .................... 704/10 |

OTHER PUBLICATIONS

Yang et al., "statistics-based segment pattern lexicon—a new direction for Chinese language modeling", 0-7803-4428-Jun. 1998, IEEE, pp. 169-172.*
Lucas Chi Kwong Hui, "Color Set Size Problem with Applications to String Matching," Proc. of 2nd Symposium on Combinatorial Pattern Matching, 1992, pp. 230-243.

* cited by examiner

*Primary Examiner*—David R. Hudspeth
*Assistant Examiner*—Qi Han
(74) *Attorney, Agent, or Firm*—Ference & Associates LLC

(57) ABSTRACT

A method of and system for automatically extracting new words are provided. The method and system are highly efficient for automatically extracting new words from a mass amount of cleaned corpus.

15 Claims, 4 Drawing Sheets

METHOD AND SYSTEM FOR AUTOMATICALLY EXTRACTING NEW WORD

CLAIM FOR PRIORITY

This application claims priority from Patent Application No. 00126471.0, filed on Aug. 30, 2000, in the Peoples Republic of China, and which is hereby incorporated by reference as if fully set forth.

FIELD OF THE INVENTION

This invention relates to the technical field of language processing, in particular, to a method and system for automatically extracting new words from a corpus.

BACKGROUND OF THE INVENTION

Words are the base for many language-processing technologies. For example, vocabularies with different properties are the base of natural language understanding, machine translation, automatic abstract, etc. For information retrieval, words are used as searching units to reduce the redundancy of search results. For speech recognition, words are also used as the lowest level of language information to resolve the character level acoustic ambiguities. Further, language models are often built on word level to resolve the acoustic ambiguity. For some languages, however, such as Chinese and Japanese, there is no word boundary in written languages, and words are not well defined. For example, some people may think "吃东西" as one word, and some other people may think they are 2 words "吃" and "东西". Generally a Chinese word is composed of one or more Chinese characters, and is a basic unit with certain meaning. There are different vocabularies collected manually with different coverage for different domains. However it's not an easy task to collect such vocabularies. Furthermore, languages are developing with new words emerging dynamically. For example, "互联网" was not a word some time ago, but it is now widely used. It is very demanding to automatically extract new words given a large amount of corpus.

A need therefor exists for a method and system for automatically extracting new words from a corpus.

SUMMARY OF THE INVENTION

In one aspect, the present invention provides a method for automatically extracting new words from a corpus comprising the steps of: segmenting a cleaned corpus to form a segmented corpus; splitting the segmented corpus to form sub strings, and counting the occurrences of each sub strings appearing in the given corpus; and filtering out false candidates to output new words.

In another aspect, the present invention provides a system comprising a segmentor which segments a cleaned corpus to form a segmented corpus; a splitter which splits the segmented corpus to form sub strings, and which counts the number of the sub strings appearing in the corpus; and a filter which filters out false candidates to output new words.

DETAILED DESCRIPTION OF THE PREFERRED EMBODIMENTS

Figure 1:
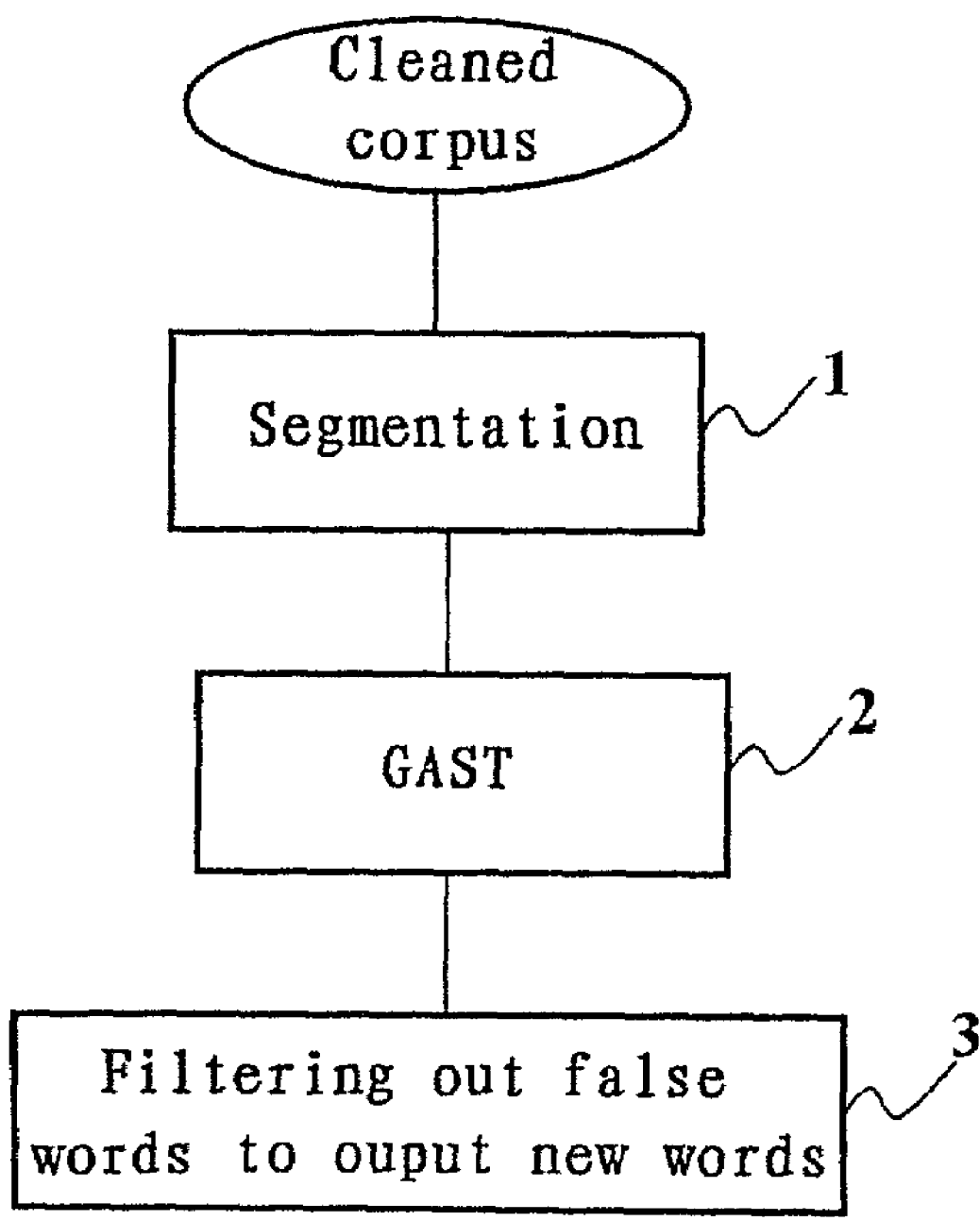
FIG. 1 illustrates a conceptual diagram for automatically extracting new words from a large amount of corpus according to the present invention.

FIG. 1 illustrates a conceptual diagram for automatically extracting new words from a large amount of corpus according to the present invention. As illustrated in FIG. 1, the system of the invention comprises a section 1 for segmenting a cleaned corpus with any segmentation methods, such as maximum matching method or statistic segmentation which are used widely or a method of the invention which will be described in detail below, into unit sequences to form a segmented corpus; a GAST section for constructing a GAST with the unit sequences as inputs and getting counts of sub strings of these unit sequences appearing in the segmented corpus; and a section 3 for filtering out false candidates before outputting true new words. The operation of each section will be described in detail below.

Figure 2:
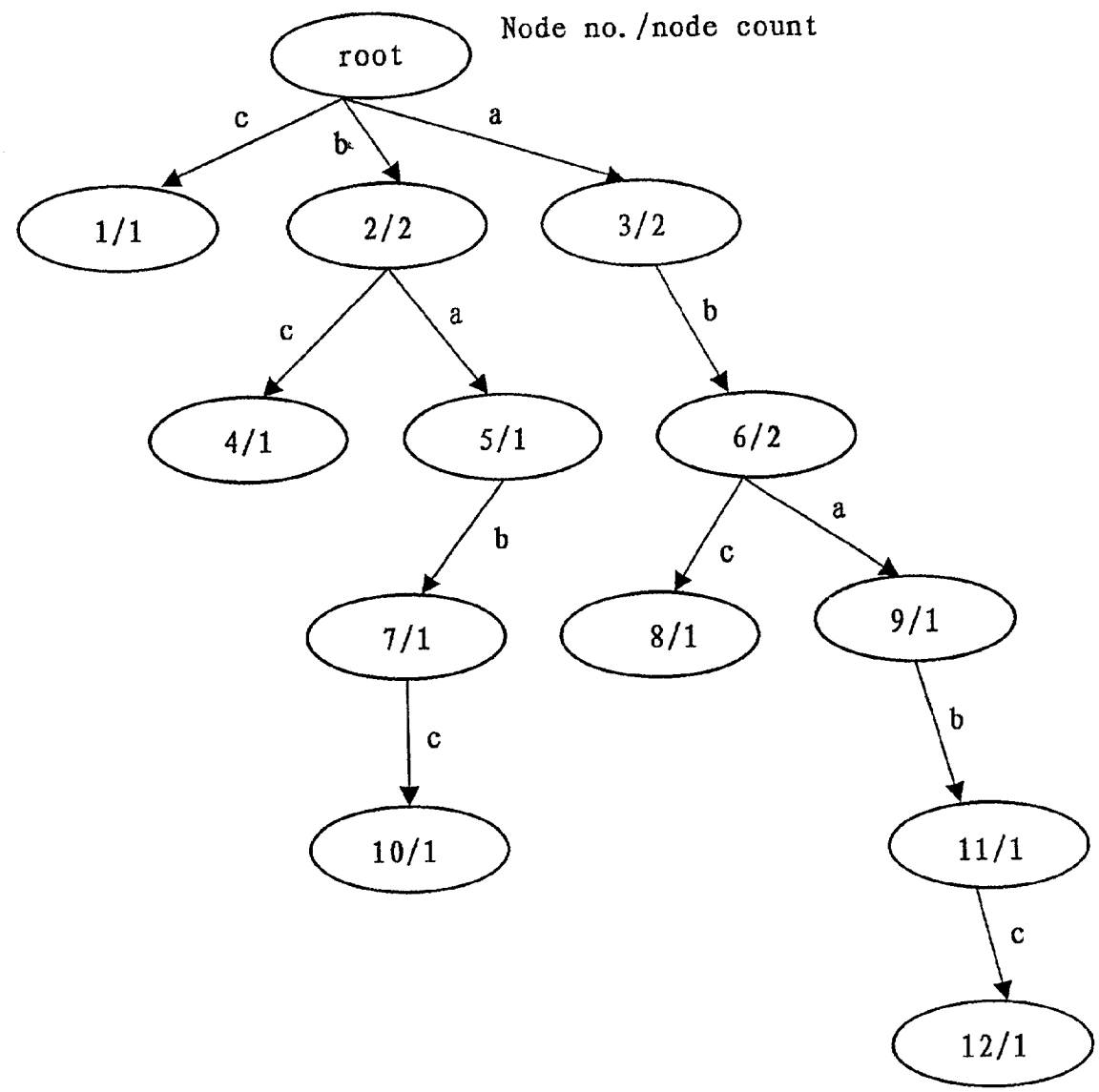
FIG. 2 shows an example of AST of string (ababc).

A method for constructing a general atom suffix tree (GAST) according to the present invention will be described. A string $S=\mu 1, \mu 2 \ldots \mu N$ is defined, where $\mu i$ is a unit string of S. We call suffix$_i=\mu_i, \mu_{i+1} \ldots \mu_N$ ($1 \leq i \leq N$) as a suffix string of S. An atomic suffix tree (AST) of a string S is a tree with edges and leaves. Each leaf in AST is associated with an index i ($1 \leq i \leq N$) corresponding to suffix$_i$. Each edge is labeled with characters such that only one unit string is on the edge and the concatenation of the labeled edges that are on the path from the root to leaf with index i is suffix$_i$. FIG. 2 is an example of AST of string (ababc). For the construction of an AST, detailed disclosure may be found in Lucas Chi Kwong Hui, Color Set Size Problem with applications to String Matching, Proceedings of the 2nd Symposium on Combinatorial Pattern Marching, 1992, pp. 230-243. This article is incorporated herein by reference. When building such AST, the information of each node of AST can be obtained, including:

---

Node current (Example: node 6)
{
    its Path (the concatenation of the labeled edges that are on the path from the root to node i); (Path for node 6 is "ab")
    its path's Count (the occurrences of such path appearing in the string); ("ab" appears 2 times in string ababc)
    its Children node i, ..., node j; (node 8 & node 9)
    its Father node f; (node 3)
}

---

The AST for string S with length (S)=N can be built in O (N2) space. For those nodes whose counts are n, it means they are reused by (n−1) times when building AST. If the saved space of reused nodes is ignored, the size of AST is:

$$\frac{N(N+1)}{2}.$$

Actually this is the summation of the counts of all nodes.

The concept of AST can be extended to store more than one input strings. This extension is called the General AST (GAST). If there are M strings, $S_1, S_2, \ldots, S_M$ with length $N_1$ ($1 \leq l \leq M$), the number of nodes (space required) for GAST is:

$$\sum_{l=1}^{M} \frac{N_l(N_l + 1)}{2}$$

Figure 3:
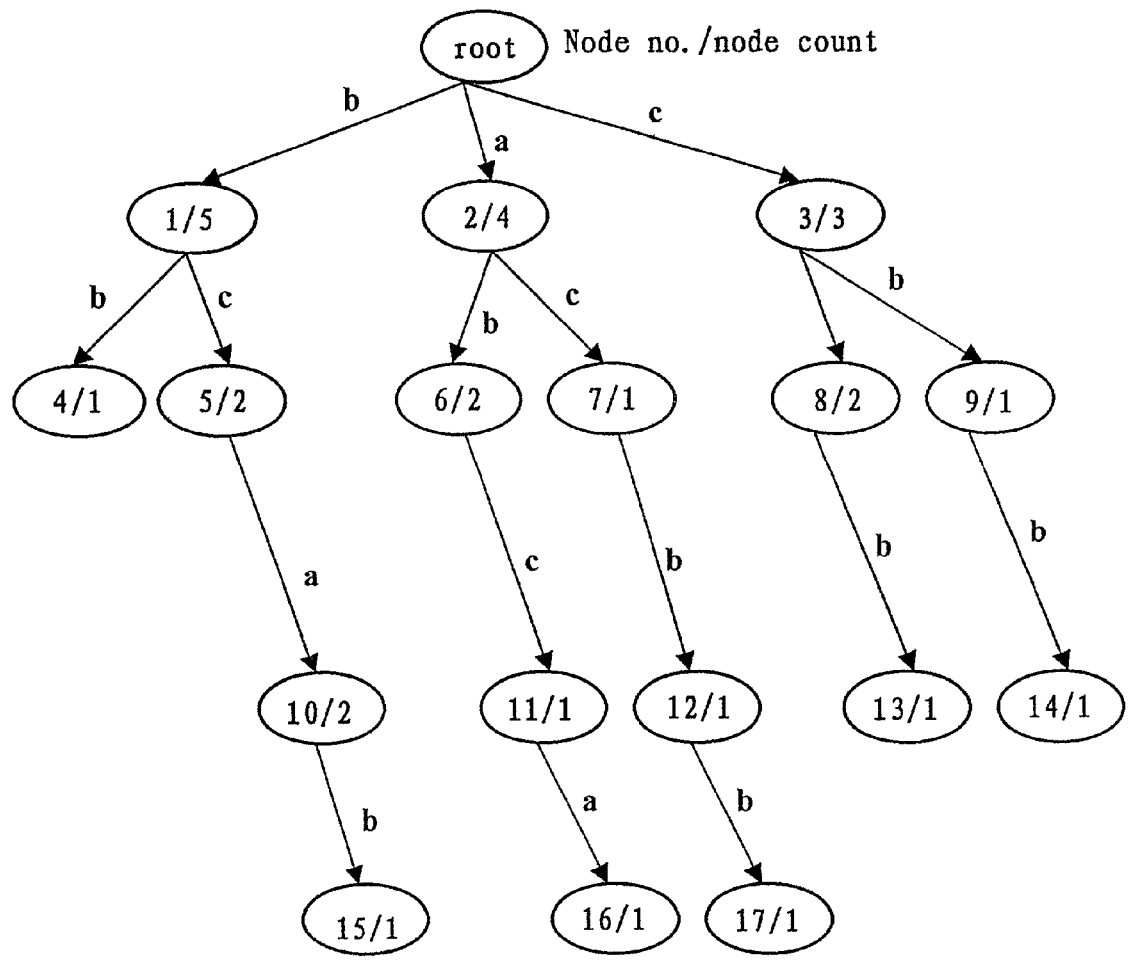
FIG. 3 illustrates an example of a General Atom Suffix Tree (GAST)

FIG. 3 is an example of GAST for strings "abca", "bcab", "acbb". From the tree-like data structure of GAST, it is easy to get the list of all sub strings and their occurrences appearing in corpus.

Descriptions below are directed to patterns of segmentation boundaries (SB) and new words, and required space reduction for GAST.

Even GAST is a good data structure that compactly represents strings, there are practical issues to use it for ANWE (Automated New Word Extraction). The space required is too large for constructing an efficient/feasible GAST from a large amount of corpus.

Normally new words for a new domain need to be extracted from several millions to several hundreds of millions corpus. If they are used as one input string to AST, the size of the AST is not practical to be constructed because of space demand. By defining the patterns of SBs and new words, the long input strings can be split into small pieces which results in significant required space reduction when GAST is constructed and practical implementation of ANWE.

As stated above, the size of AST for a string S with length (S)=N is $$\frac{N(N+1)}{2}.$$

If this string can be split into k equal pieces, the space required for GAST of k sub strings is $$\frac{N}{2}\left(\frac{N}{k} + 1\right).$$

The saved space is $$\frac{N^2}{2}\left(1 - \frac{1}{k}\right).$$

For example, if a 10-character string is split into 2 equal pieces, the saved nodes of GAST are 25. If a 20-character string is split into 4 equal sub strings, the saved nodes are 150 ones!

Since a target new word will not be too long, it is very critical to define good SBs to split the long strings into small pieces while not losing good potential new words. Some SB Patterns (SBP) definitions follow:

SBP A: Punctuations are natural SBs.

SBP B: Arabic digits and alphabetic strings within the corpus are another kind of SBs.

For further SBPs, we think of 2 cases:

1. Sub strings are selected based upon new word patterns which are defined by using common vocabulary as a base.

Even there are various domains and each domain has its specific vocabulary, and even the languages are developing dynamically, there are some common words which are used in all domains and all the time, such as "因为", "东西" etc. Also each Chinese character itself is a basic word. This vocabulary can be used with common words to segment the corpus first. The segmented corpus will be composed of single character and multi-character words. For example, the following sentence

代表着未来生活方式的互联网技术将不再会将弱视和失明者拒之门外。 may be segmented as

代表着未来生活方式的互联网技术将不再会将弱视和失明者拒之门外。

Assuming w denotes a multi-character word, which means a word is composed of more than one character, and c denotes a single-character word, the above-sentence may be represented as $w_1 c_1 w_2 w_3 w_4 c_2 c_3 c_4 c_5 w_5 c_6 w_6 c_7 c_8 w_7 c_9 w_8 c_{10} c_{11} c_{12} w_9$ in which w3 refers to "东西" and c4 refers to "联", etc.

New Word Patterns (NWPs) can be defined as follows:

NWP A: $c_i c_{i+1} \ldots c_j$, which means strings composed of all single character words. For example, "互联网" in the above sentence.

NWP B: $w_i c_k$ or $c_i w_k$ or $w_i c_k w_{i+1}$ or $c_i w_k c_{i+1}$, which means strings composed of single character words and multi-character words. For example, "失明者" in the above sentence.

For those patterns $w_i w_{i+1}$, which means a multi-character word followed by another multi-character word, they can be normally interpreted as compound words, and are not additionally informative. So SBs can be set between multi-character words. Such a pattern is referred to as SBP C hereinafter.

The above sentence can be parsed based on the above SBPs. Since both "未来" and "东西" are known multi-character words, the consecutive combination of "未来" and "东西" belongs to a multi-character word followed by another multi-character word. Similarly, the consecutive combination of "东西" and "方式" belongs to a multi-character word followed by another multi-character word also. Correspondingly, a SBP C can be set between "未来" and "东西" and between "东西" and "方式" respectively. Further, since "东西" is a known word from the common base vocabulary, it can be omitted and thus the two SBP Cs are merged.

Defining "|" as the symbol of the SB, after setting boundaries, the parsed sentence (1) then looks like:

代表着未来|方式的互联网技术将不再会将弱视和失明者拒之门外| which means 2 sub strings:

代表着未来

方式的互联网技术将不再会将弱视和失明者拒之门外 will be as inputs to build GAST rather than the whole sentence (1).

The variations of such patterns under the same guideline can be detailed further if required, to reduce the required space for GAST. For example, more definitions of SBP and NWP may be added and/or the above definitions of SBP and NWP may be modified. In alternative embodiments, for example, a multi-character word, which comprises a multi-character word comprised of merely two characters and another multi-character word comprised of merely two characters, may not be regarded as a compound word, i.e., may be regarded as a potential new word. Based upon the analysis of structure of a word, variant new word patterns may be designed by a person skilled in the art. Such a technology of splitting a long sentence in a cleaned corpus into short strings may be applied into other language processing fields.

In an example, 30,000 common words are used as the base vocabulary, and when we analyze an existing domain specific vocabulary for information technology (IT) with 3497 words, there are 990 NWP A words and 2507 NWP B words.

With SBPs defined above, we get some statistics for 1M corpus in information technology (IT) domain listed in Table 1. It can be seen from Table 1 that with SBP A, B and C, the number of GAST nodes, i.e. the space required to build the GAST, reduces dramatically.

2. There is not a common vocabulary as a base, ANWE starts from single character words.

This may be treated as a special case of 1, where the base vocabulary is composed of single character words only. In such case, only SBP A and B can be used to split the corpus. GAST may be further pruned according to upper limitation of word length required. Normally long words can be split into several sub-words, and there is an upper boundary of word length Nup for a vocabulary, for example Nup=5 or 7. Those nodes whose path length≧Nup can be pruned when building an AST. The size of the AST for string with length N would then be reduced from $$1+2+3+\ldots+N \text{ to } \frac{1+2+\ldots+Nup+\ldots+Nup}{N}.$$

The space required for 1M IT corpus with this method is listed in Row 5 of Table 1. Compared with Row 2, the saved space is 110, 162 nodes.

TABLE 1

The statistics from 1M corpus in IT domain

| 0. Base Vocabulary (words) | SBP | Number of SBs | Average length of string pieces | No. of GAST nodes |
|---|---|---|---|---|
| 1. All Chinese character | A | 29,768 | 12.46 | 2,496,219 |
| 2. All Chinese character | A + B | 38,063 | 8.22 | 1,442,366 |
| 3. 60 k | A + B + C | 31,921 | 4.52 | 398,220 |
| 4. 30 k | A + B + C | 31,515 | 4.61 | 407,522 |
| 5. All Chinese character | A + B & Nup = 7 | 38,063 | 8.22 | 1,332,204 |

With the mechanism above, the required space to build the GAST for ANWE is acceptable/manageable. After the construction of GAST, new words can be extracted as described below.

The definition of word is essentially those strings that are often used together. Therefore, the count of a node path is the base criteria to decide if this path indicates a new word or not. If a "new word" is defined as a consecutive character string which occurs at lease K times in given corpus, in which K is a natural number and may be predetermined depending on specific applications, for example, K=5, the basic concept of automatic new word extraction is to build corresponding GAST using methods described above, then the count for each node inside this tree is adjusted, and if the modified count>=K, then the corresponding sub string is one of new words defined. A person skilled in the art will know how to set an appropriate threshold K for a specific application by means of try and error method and analysis, etc.

Since it is impossible to ensure that all new words extracted by GAST are reasonably useful, several techniques may be applied in practice to prune generated new word in order to get reasonably useful new words. These techniques are now briefly described.

A. Functional Word Elimination

In Chinese or Japanese, some characters are used very frequently such as "的", "也" or "了". These auxiliary words should not be the ending part of any new word no matter how big the occurrences of sub strings are.

B. Longer Word Preferential

In GAST, if a node count is equal or nearly equal to summation of the counts of its all sub-nodes and all of the sub-nodes have been outputted, which means the corresponding sub string of this node never occurs alone in given corpus, so that this sub string should not be a new word even if its count>=K. Because some new words may occur alone or along with other longer ones, in practical realization, whenever a longer word is output, the node counts of all sub strings belong to the string corresponding to the longer word may be subtracted by the node count of the longer string respectively. If the node count of a certain sub string is finally larger than K, it can be determined that besides occurring along with the longer word, the sub string itself occurs alone as a word.

Method A and method B effectively prune those new words which are not interested in by the invention.

C. Filtering out rules may be established based upon prior probabilities. For example, if there is a prior statistic language model derived from standard corpus where we can get Ps(w1 . . . wn), which is the probability of the new extracted word NW=w1 . . . wn, we can calculate Pc(w1 . . . wn) from the current corpus easily. If Pc(w1 . . . wn)/Ps(w1 . . . wn) is large, it means this new word appears relatively more frequently in the current corpus than in standard corpus. So it is a real new word for this domain. Otherwise, it means this new word combinations are common for standard domain also, so not a new word.

Figure 4:
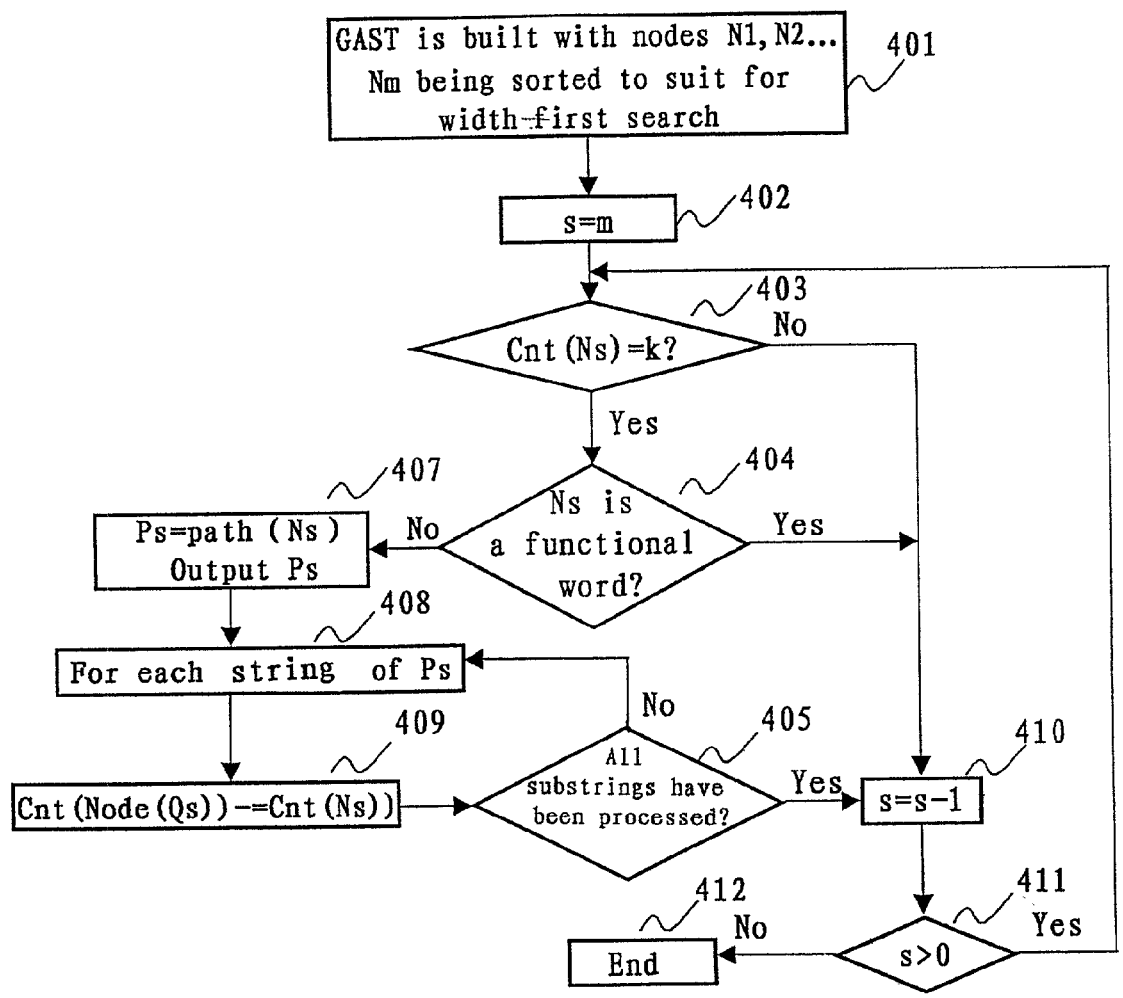
FIG. 4 illustrates a preferred embodiment for implementing the method of the invention.

FIG. 4 illustrates a preferred embodiment for implementing the method of the invention. As shown in FIG. 4, the process begins from block 401 in which a GAST is built with nodes N1, N2, . . . Nm being sorted to suit for width-first search. For example, as illustrated in FIG. 3, node 1/5 corresponds to node N1, node 2/4 corresponds to node N2, node 3/3 corresponds to node N3, . . . node 17/1 corresponds to node N17. Process then flows to block 402 in which a control parameter s is set to equal m. In the example of FIG. 3, m=17, therefore, s=17. Process then flows to block 403 to check whether the count of node Ns is larger than a threshold K. In the example of FIG. 3, the value of count is 1, which is smaller than the threshold (Practically, the threshold is generally larger than 1), then the process branches to block 411 to check if s is larger than 0, i.e., to determine whether there are further nodes to be processed.

If the decision is negative, the process ended at block 412. If the decision in block 411 is positive, the process returns to block 403 to check whether the node count is larger than the threshold. Assuming the value of count is larger than 0 at this time, the process flows to block 404 to check if this word is a functional word. If the decision is negative, the process flows to block 407 in which the path corresponding to the node is retrieved and outputted as a new word.

After the new word is outputted, the process flows to block 408 in which the node counts of sub strings belonging to the new word is respectively subtracted with the node counts of the new word and replaced with the subtracted ones respectively, as indicated in block 409. For example, if the new word outputted in block 407 is "日新月异", the node counts corresponding to nodes "日", "日新", "日新月", "新", "新月", "新月异", "日" and "月异" are subtracted respectively by the node count of node "日新月异" and are replaced by the new node counts respectively. In block 405, a determination is made whether all the sub strings of the new word have been processed. If all the sub strings have been processed, the process returns to block 410 to continue the above described process.

As a result of the above process, a list of new words can be obtained. It is apparent that modification of the process can be made in variant ways. For example, in this embodiment, a single word is treated as a potential new word. In an alternative embodiment, a single-character word is not regarded as a potential new word, and thus the process can be simplified and the step of deleting single-character functional words can be omitted.

It is to be understood that the present invention, in accordance with at least one presently preferred embodiment, includes a segmentor which segments a cleaned corpus to form a segmented corpus; a splitter which splits the segmented corpus to form sub strings, and which counts the number of the sub strings appearing in the corpus; and a filter which filters out false candidates to output new words. Together, these elements may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both If not otherwise stated herein, it is to be assumed that all patents, patent application, patent publications and other publications (including web based publications) mentioned and cited herein are hereby incorporated by reference herein as if set forth in their entirety herein.

It would be understood by a person skilled in the art that many modifications, enhancement, and amendments can be made to the embodiments described above without depart from the spirit and scope of the invention. For example, if a functional word as exemplified above occurs just before/after punctuation, this functional word together with the punctuation can be regarded as a SB since a functional word rarely serves as a begin part or an end part of a word. In addition, the splitting by means of common vocabulary may be combined with the splitting by means of Longer Word Preferential.

The invention claimed is:

1. A method of extracting new words automatically, said method comprising the steps of:
   segmenting a cleaned corpus in a domain to form a segmented corpus;
   splitting the segmented corpus to form sub strings, and counting the occurrences of each sub string appearing in the corpus; and
   filtering out false candidates to output new words, wherein the new words are words not contained in a base vocabulary;
   wherein the segmenting and the splitting is not dependent upon word boundaries;
   wherein new words are determined based upon the domain of the cleaned corpus;
   wherein the step of splitting and counting is implemented using a GAST (general atom suffix tree) contained in a reduced memory space;
   wherein the GAST is implemented by limiting length of character sub strings.

2. The method of extracting new words automatically according to claim 1, wherein the step of segmenting comprises using punctuations, Arabic digits and alphabetic strings, or new word patterns to split the cleaned corpus.

3. The method of extracting new words automatically according to claim 1, wherein the step of segmenting comprises using common vocabulary to segment the cleaned corpus.

4. The method of extracting new words automatically according to claim 3, wherein the step of segmenting cleaned corpus comprises using pre-recognized functional words as segment boundary patterns.

5. The method of extracting new words automatically according to claim 3, wherein the step of filtering out false words comprises:
   filtering out functional words;
   filtering out those sub strings which almost always appear along with a longer sub string; and
   filtering out those sub strings for which the occurrence is less than a predetermined threshold.

6. The method of extracting new words automatically according to claim 1, wherein the step of filtering out false candidates comprises:
   filtering out functional words;
   filtering out those sub strings which almost always appear along with a longer sub string; and
   filtering out those sub strings for which the occurrence is less than a predetermined threshold.

7. The method of extracting new words automatically according to claim 1, wherein the step of segmenting the cleaned corpus comprises using pre-recognized functional words as segment boundary patterns.

8. An automatic new word extraction system, comprising:
   a segmentor which segments a cleaned corpus in a domain to form a segmented corpus;
   a splitter which splits the segmented corpus to form sub strings, and which counts the number of the sub strings appearing in the corpus; and
   a filter which filters out false candidates to output new words, wherein the new words are words not contained in a base vocabulary;
   wherein the segmenting and the splitting is not dependent upon word boundaries;
   wherein new words are determined based upon the domain of the cleaned corpus;
   wherein the splitter builds a GAST (general atom suffix tree) contained in a reduced memory space;
   wherein the GAST limits the length of character sub strings.

9. The automatic word extraction system according to claim 8, wherein the segmentor uses punctuations, Arabic digits and alphabetic strings, or new word patterns to segment the cleaned corpus.

10. The automatic word extraction system according to claim 8, wherein the segmentor uses common vocabulary to segment the cleaned corpus.

11. The automatic word extraction system according to claim 10, wherein the segmentor uses pre-recognized functional words as segment boundary patterns.

12. The automatic word extraction system according to claim 10, wherein the filter filters out functional words; those sub strings which almost always appear along with a longer sub string; and those sub swings for which the occurrence is less than a predetermined threshold.

13. The automatic word extraction system according to claim 8, wherein the filter filters out functional words; those sub strings which almost always appear along with longer sub strings; and those sub strings for which the occurrence is less than a predetermined threshold.

14. The automatic word extraction system according to claim 8, wherein the segmentor uses pre-recognized functional words as segment boundary patterns.

15. A program storage device readable by machine, tangibly embodying a program of instructions executable by the machine to perform method steps for extracting new words automatically, said method comprising the steps of:

segmenting a cleaned corpus in a domain to form a segmented corpus;

splitting the segmented corpus to form sub strings, and counting the occurrences of each sub string appearing in the corpus; and filtering out false candidates to output new words, wherein the new words are words not contained in a base vocabulary;

wherein the segmenting and the splitting is not dependent upon word boundaries;

wherein new words are determined based upon the domain of the cleaned corpus;

wherein the step of splitting and counting is implemented using a GAST (general atom suffix tree) contained in a reduced memory space;

wherein the GAST is implemented by limiting length of character sub strings.

\* \* \* \* \*